United States Patent [19]

Neesz

[11] Patent Number: 4,724,366
[45] Date of Patent: Feb. 9, 1988

[54] RANDOMIZED MOTOR DRIVE

[75] Inventor: John J. Neesz, Rochester, Minn.

[73] Assignee: International Business Machines Corporation, Armonk, N.Y.

[21] Appl. No.: 378,930

[22] Filed: May 17, 1982

[51] Int. Cl.[4] .............................................. H02K 27/20
[52] U.S. Cl. .................................... 318/301; 318/327; 318/461
[58] Field of Search ................. 368/201; 360/69, 73; 364/152, 154, 155; 318/314, 334, 326, 327, 471, 472, 461–465, 313

[56] References Cited

U.S. PATENT DOCUMENTS

| | | | |
|---|---|---|---|
| 3,176,208 | 3/1965 | Gifft | 318/314 |
| 3,858,100 | 12/1974 | Bussi et al. | 318/314 |
| 3,895,486 | 7/1975 | Hammer et al. | 368/201 |
| 3,950,682 | 4/1976 | Dohanich | 318/314 |
| 4,007,605 | 2/1977 | Denny | 318/334 Y |
| 4,015,182 | 3/1977 | Erdman | 318/334 |
| 4,375,609 | 3/1983 | Wolf | 318/317 |

Primary Examiner—Ulysses Weldon
Attorney, Agent, or Firm—Robert W. Lahtinen

[57] ABSTRACT

The circuit provides damping for digitally controlled devices where the provision of power pulses in response to sensing a given device parameter may result in a regularity of pulses that causes a resonant condition with a frequency that interferes with other device functions or induces error conditions. The circuit shown randomizes to a motor by random gating of a sequence of commands retained in a shift register. Random gating from the shift register positions occurs through the use of a counter driven by an oscillator, independent of other device functions and clocking circuits, in conjunction with an enabling circuit from a random digitized data source that enables or disables counter advance by the oscillator. In the disk drive environment shown, randomizing has no significant effect on the closely regulated speed since the corrective commands occur during each sector of revolution or about thirty-six hundred times per second and motor rotational inertia precludes any meaningful change during a sector rotation.

8 Claims, 7 Drawing Figures

RANDOMIZED MOTOR DRIVE

BACKGROUND OF THE INVENTION

This invention pertains to the damping of digitally controlled devices and more particularly is directed to randomizing techniques for preventing the occurrence of frequency conditions that interfere with other electrical functions of the device.

Where an electrical device is supplied with power in the form of a pulse as required by a sensed parameter, there exists the possibility that the recurring pulses may occur at a frequency that interferes with other functions of the device. One such environment is an information storage disk drive where there is electrical control over the motor which drives the disk media, the actuator that moves the transducer heads to specific track locations subject to electrical drive and control and ultimately the reading and writing of data on the tracks and sectors which is effected by small values of electrical signal. These multiple functions must be organized and designed to function without interfering with one another. The motor drive which involves stronger electrical signals is most likely to cause interference if common frequencies or resonance conditions occur.

SUMMARY OF THE INVENTION

The invention is shown in the environment of a motor used to control the rotation of an information carrying disk media. The motor is pulsed periodically in response to the disk speed which is sensed during each sector portion of a revolution. This may occur in excess of fifty times per revolution of the disk to enable close regulation and correction of the speed of disk rotation. The design of the device would optimally produce an approximately 50% duty cycle which would result in gating a power pulse to the motor during alternate sector times. The occurrence of such a regularly appearing power pulse would give rise to a resonant frequency within the human audible range.

The purpose of this invention was to prevent the motor power (a large electromechanical energy system) from being delivered synchronous to file actuator, and head suspension mechanical resonances in the direction tangential to the disk. These resonant frequencies are in the middle of the human audio response area and the resulting acoustic sound (amplified by file casting cavities) is objectionable to the ear.

To overcome this problem, a randomized circuit has been interposed in the motor drive line. As shown, a four-bit shift register is loaded during each sector time with a first logic level if a reduced speed indicates the need for a power pulse or a second level if the speed exceeds the predetermined value and the disk is to be allowed to coast for one sector. Instead of sending a pulse to the motor during the sector time following the reduced speed sector, a random enabling circuit selects the condition existent during one of the last four sectors to use as a gating signal for a sector pulse.

It is possible that the random selection may not gate a pulse for one or two sector times during which the sensed speed calls for a pulse, but such an occurrence would continue the sensed need for a power pulse and increase the number of shift register positions recording a first logic level. This would increase the probability of a gated pulse until in four sector times all shift register positions would cause gating if selected. It would likewise be possible to gate pulses for four consecutive sector times when no speed increase was sought, but even the most unlikely random selection would not significantly disturb speed regulation since the velocity sensing and correction occur about 1800 times per second and motor rotational inertia precludes any significant velocity change during a single sector time.

The randomized selection of gated shift register positions is enabled by a counter that is advanced by the condition of a digitized data stream and is clocked by an oscillator which has a frequency greater than the sector times (often 2000 to 3000 times the sector time) and is not synchronized with or related to the other circuit clocks or functions.

DETAILED DESCRIPTION

Figure 1:
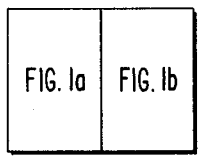
FIG. 1, composed of FIG. 1A and FIG. 1B, shows the invention in the environment of a circuit for randomizing the power pulses to a motor for rotating an information handling disk assembly.
Figure 1A:
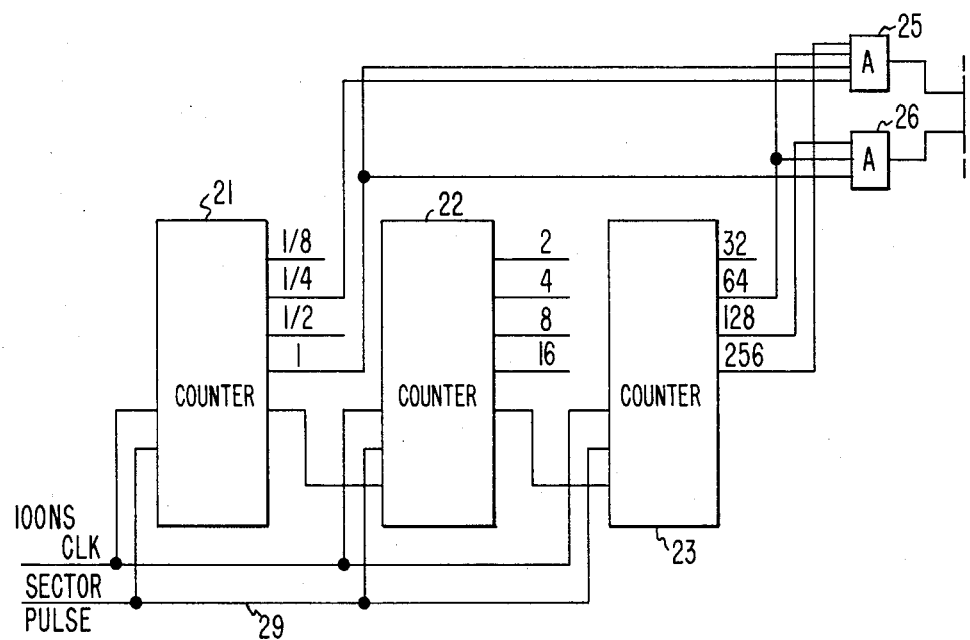

The invention is shown and described in the environment of a magnetic disk drive 40 wherein the motor 41 rotates the disk media 42 and must have a closely maintained speed regulation. The disk 42 is divided into sectors, each of which has an identifier (ID) sector portion 50 and a data sector portion 51. Each ID sector portion 50 includes a pre-written unique sequence of signals that indicates the beginning of a sector or identifies the same rotational position in each sector. By sensing consecutively identified unique signal sequences, the sector to sector travel and in conjunction with elapsed time, the velocity during the sector is obtained. The velocity is sensed during each of the more than fifty sectors per revolution so that more than 3000 sensed velocity values and corrections occur during each second.

Referring to FIG. 1, the motor drive signal 10 becomes active when the drive is turned on and causes a continuous signal 14 unless degated by AND 11 upon the occurrence of a winding overcurrent signal 12. During run conditions when the ID in sync signal 15 is at an up level, the gating of current pulses to the motor windings on line 16 is controlled by the hardware circuit including counters 21, 22 and 23. One byte time clocked by the four bit counter of counter 21 is eight times the one hundred nanosecond clock or eight hundred nanoseconds. The AND gates 25, 26 are connected to various outputs of counters 21 and 23 such that AND 26 causes latch 28 to be reset at byte count 208 and AND 25 causes latch 28 to be set at a byte count of 340. If the 340 count is reached, which corresponds to a 272 microsecond period, the setting of latch 28 indicates a slow sector and enables the gating of a power pulse to the motor during the next subsequent sector. If the 340 count is not reached before the counters are reset by a sector pulse signal 29, indicating that the speed during the sector was greater than the threshold value below which the motor is to receive a power pulse, the latch 28 remains reset and no signal appears on line 16. This would normally cause the drive to be allowed to coast during the next subsequent sector rotation.

Under these conditions a duty cycle of 50% which actuates the motor during alternate sectors may cause a resonant frequency that is within the human audible range.

Figure 1B:
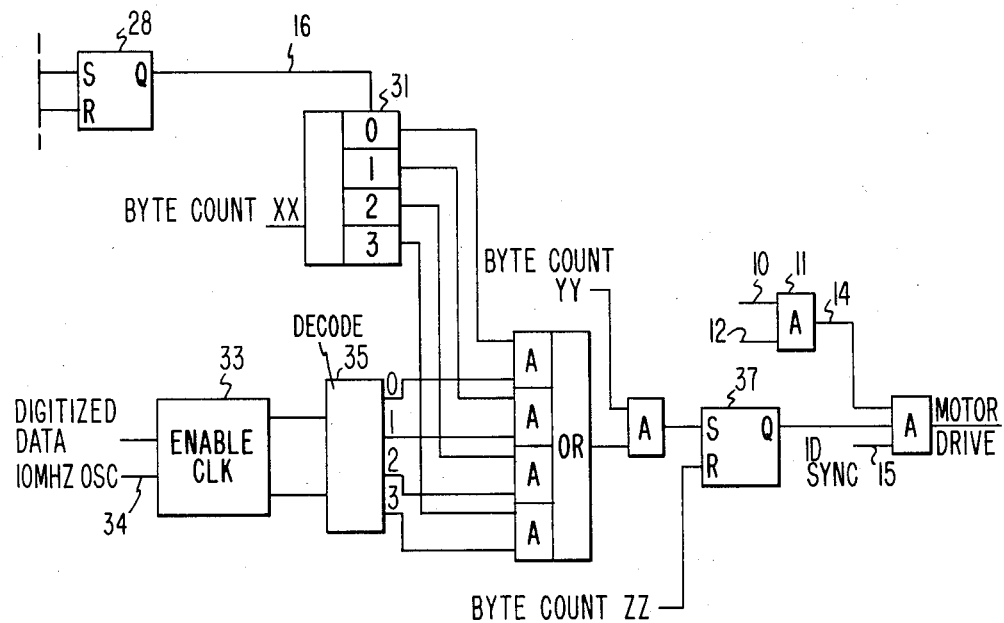

To overcome this frequency condition, the hardware circuits of FIG. 1B are utilized to randomize the motor drive signals. Referring also to the timing diagram of FIG. 2, the logic level on line 16 is clocked into shift register 31 at byte count XX. Thus the speed conditions sensed during a sector result in a signal on line 16 as a consequence of setting latch 28 that is effective during the next subsequent sector. The logic levels in the four positions of shift register 31 represent the logic levels indicative of velocity obtained during the last four sector times.

Figure 3:
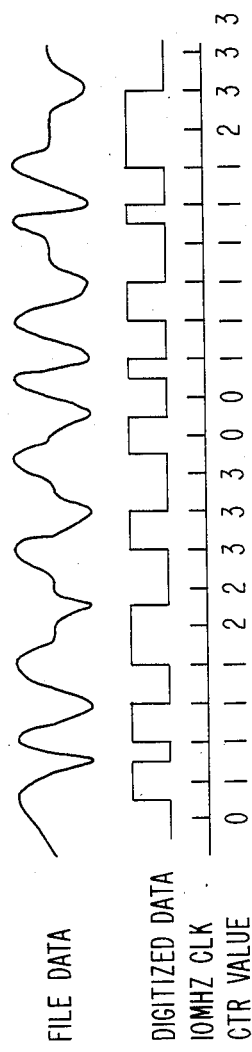
FIG. 3 is a timing diagram showing the random alteration of the clock count using the digitized data.
Figure 4:
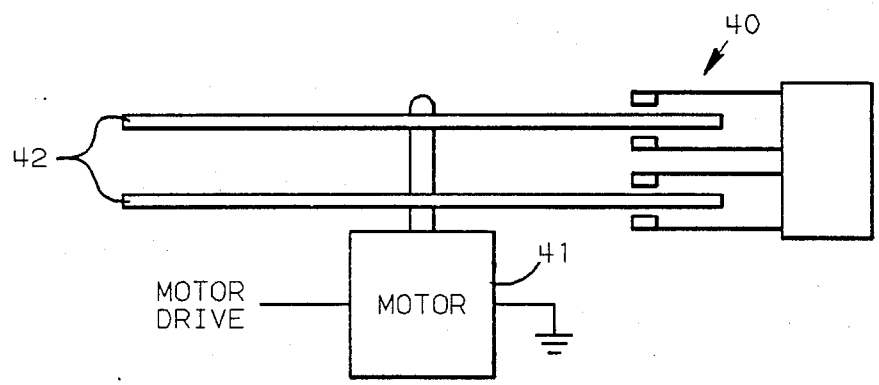
FIG. 4 is a schematic showing of a disk drive illustrating the spindle motor, disks and actuator.
Figure 5:
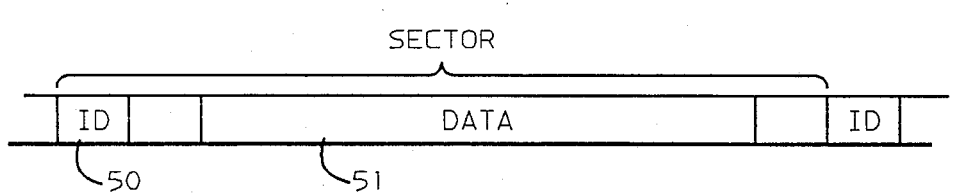
FIG. 5 illustrates a data track portion from the disk surface showing a sector with an identifier (ID) field, a data field and the intervening gaps. For purposes of illustration the track is shown as a straight path rather than arcuate; however, the curvature during a single sector is small since there are typically 50 to 70 sectors per track.

The randomized gating is generated by a two-bit counter 33 which has as one input a crystal oscillator, which it is to be noted is not synchronized with the other functions of the drive or control circuits and occurs approximately 2000 to 3000 times per sector, but is not coordinated therewith. The enabling signal is secured from the field data and uses the digitized data signal as a random source. Whenever the oscillator signal 34 occurs while the digitized data signal is at an up level, counter 33 is permitted to advance. Thus the counter value is permitted to change irregularly as shown by the sequence entitled "CTR value" in FIG. 3. At byte count YY the logic level of the shift register position selected by the decode or de-multiplexer circuit 35 in accordance with the two-bit output count status of counter 33 as gated to latch 37. If an up level is gated from the selected position of shift register 31, latch 37 is set and a power pulse is transmitted to the motor. If a down level is gated from the selected position of shift register 31, latch 37 remains reset and no power pulse is transmitted to the motor windings, causing the motor to coast for one sector time. Latch 37 is reset at byte count ZZ and accordingly a power pulse to the motor has a duration from byte count YY to byte count ZZ.

Figure 2:
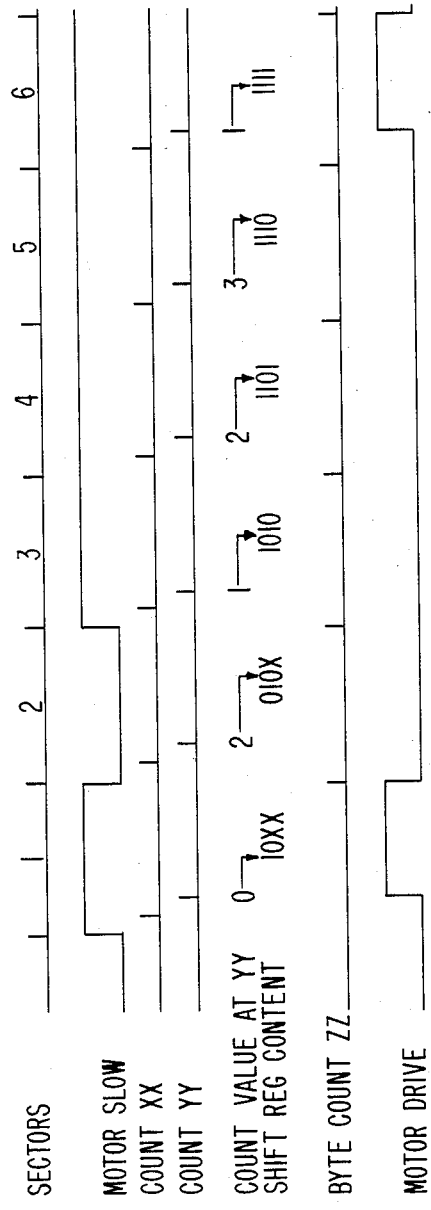
FIG. 2 is a series of timing diagrams showing the timing of various portions of the circuitry of FIG. 1.

In the sequence illustrated in the timing diagrams of FIG. 2, the counter 33 count values at byte YY time and the shift register 31 content sequences demonstrate the random selection which results in no power pulse during sectors when a power pulse is indicated. During sector one, count value zero selects a register position containing a one logic level which causes latch 37 to be set and a power pulse to be generated. During secotr two, count value two selects a zero level which happens to be the same value as the zero level entered at byte count XX time into the shift register 31 position zero. However, at sector three the motor slow signal enters a one level into shift register 31 position zero at byte XX time while the random selection at byte count YY counter 33 value two yields a logic level zero allowing the motor to coast for a sector. Likewise during sectors four and five the random selection at byte count YY selects a shift register bit position with a down level that permits the motor to coast despite the signal on line 16 which calls for a power pulse. However, during sector six all positions in register 31 contain one level and a power pulse will be gated to the motor irrespective of the randomly selected shift register 31 bit position. The deviation between the motor slow signal and the power pulses caused by the randomization are not of consequence since the high rotational inertia of the motor results in little change during a sector time and no compromise of the average speed over time. Also, the use of a crystal oscillator rather than a variable frequency oscillator (VFO) as the input to counter 33 is preferred. The crystal oscillator has more jitter relative to the data which results in less repeatability of the counting function.

While the invention has been particularly shown and described with reference to a preferred embodiment thereof, it will be understood by those skilled in the art that various changes in form and details may be made therein without departing from the spirit and scope of the invention.

I claim:

1. In a device for digitally controlling the supply of power to a powered unit where the requirement for a power pulse is regularly ascertained during recurring times and a pulse is supplied in response to the indicated power requirement, randomizing means comprising
    means for recording one of the requirement for power and the lack of a need for a power pulse during a current time period and a predetermined plurality of successive, immediately preceding previous periods;
    means for randomly selecting one of said periods; and
    gating means for transmitting a power pulse to said unit connected to the output of said one of said periods with said gate being enabled if said one of said periods records a requirement for power.

2. The device of claim 1 wherein said means for recording is a shift register having a number of positions equal to the sum of the current period and the predetermined plurality of successive, immediately preceding previous periods in which a first logic level is entered when power is required and a second logic level is entered when power is not required.

3. A motor speed regulation system for a motor wherein each revolution is divided into a plurality of sectors comprising
    means for determining the speed during a sector of rotation and generating a first signal value if the determined speed is below a threshold value and generating a second signal value if the determined speed is not below said threshold value;
    storage means for retaining a predetermined number of the most recent first and second signal values;
    gate means for supplying a pulse to said motor for a predetermined period; and
    randomizing means for randomly enabling one of said predetermined number of most recent signal values to be communicated to said gate means, said gate means being enabled when said signal has said first value and not being enabled when said signal has said second value.

4. The motor speed regulation system of claim 3 wherein said storage means comprises a shift register having a number of positions equal to said predetermined number of most recent signal values and said randomizing means connects one of said shift register positions to said gate means.

5. The motor speed regulation system of claim 4 wherein said randomizing means includes oscillator means which is not synchronized with the other elements of the motor speed regulation system and cooperating circuit means for interconnecting said gate means and one of said shift register positions in an unpredictable sequence.

6. A motor speed regulation system for a motor driving a data storage disk media wherein each revolution is divided into a plurality of sectors comprising means for sensing the velocity during a sector of rotation and generating a first binary value if the determined speed is below a threshold value and generating a second binary value if the speed is not below said threshold value;

shift register storage means having a predetermined number of storage positions for retaining said binary values;

loading means for loading the indicated one of said binary values into said shift register during each sector of motor travel;

gate means for supplying a power pulse to said motor; and randomizing means for randomly connecting one of said shift register positions to said gate means, whereby said gate means may be enabled when said shift register position contains said first value and may not be enabled when said one shift register position contains said second value.

7. The motor speed regulation system of claim 6 wherein said randomizing means includes oscillator means, not synchronized with remainder of said motor speed regulation system, in cooperation with a digitized signal sequence to randomly select said shift register positions for connection to said gate means in an unpredictable sequence.

8. The motor speed regulation system of claim 7 wherein both the elapsed times between successive sectors and between randomizing oscillator means pulses is less than 1 millisecond.

* * * * *